(12) United States Patent
Ellis et al.

(10) Patent No.: US 7,968,661 B2
(45) Date of Patent: *Jun. 28, 2011

(54) METHOD OF FREE RADICALLY POLYMERIZING VINYL MONOMERS

(75) Inventors: Mark F. Ellis, St. Paul, MN (US); Peter A. Stark, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 852 days.

This patent is subject to a terminal disclaimer.

(21) Appl. No.: 11/275,370

(22) Filed: Dec. 28, 2005

(65) Prior Publication Data

US 2007/0149698 A1    Jun. 28, 2007

(51) Int. Cl.
| | |
|---|---|
| C08F 2/00 | (2006.01) |
| C08F 20/06 | (2006.01) |
| C08F 118/02 | (2006.01) |
| C08F 218/02 | (2006.01) |
| C08F 12/02 | (2006.01) |
| C08F 212/06 | (2006.01) |
| C08F 16/12 | (2006.01) |
| C08F 16/16 | (2006.01) |

(52) U.S. Cl. .............. 526/222; 526/317.1; 526/319; 526/330; 526/346; 526/347; 526/332; 526/334

(58) Field of Classification Search ............. 526/317.1, 526/319, 330, 346, 347, 222, 332, 334
See application file for complete search history.

(56) References Cited

U.S. PATENT DOCUMENTS

| | | | |
|---|---|---|---|
| 3,786,116 A | 1/1974 | Milkovich et al. | |
| 3,842,059 A | 10/1974 | Milkovich et al. | |
| 4,181,752 A | 1/1980 | Martens et al. | |
| 4,732,808 A | 3/1988 | Krampe et al. | |
| 4,737,559 A | 4/1988 | Kellen et al. | |
| 4,737,577 A * | 4/1988 | Brown ................. | 528/501 |
| 4,826,901 A | 5/1989 | Ittmann et al. | |
| 5,266,402 A | 11/1993 | Delgado et al. | |
| 5,407,971 A | 4/1995 | Everaerts et al. | |
| 5,637,646 A | 6/1997 | Ellis | |
| 5,741,542 A | 4/1998 | Williams et al. | |
| 5,753,768 A | 5/1998 | Ellis | |
| 5,795,650 A | 8/1998 | Watanabe et al. | |
| 5,986,011 A | 11/1999 | Ellis | |
| 6,127,002 A * | 10/2000 | Callahan et al. ......... | 427/472 |
| 6,136,807 A | 10/2000 | Braun | |
| 6,232,366 B1 | 5/2001 | Wang et al. | |
| 6,479,073 B1 * | 11/2002 | Lucast et al. ........... | 424/448 |
| 6,624,273 B1 | 9/2003 | Everaerts et al. | |
| 6,673,892 B2 | 1/2004 | Martinez et al. | |
| 6,927,267 B1 * | 8/2005 | Varela de la Rosa et al. | 526/287 |
| 2003/0051807 A1 | 3/2003 | Yamaguchi et al. | |
| 2005/0208298 A1 * | 9/2005 | Neubert et al. ......... | 428/354 |
| 2006/0205835 A1 | 9/2006 | Husemann et al. | |

FOREIGN PATENT DOCUMENTS

| | | |
|---|---|---|
| DE | 102 59 460 | 7/2004 |
| EP | 1433829 A1 * | 12/2002 |
| JP | 10-87740 | 4/1998 |
| KR | 10-1995-18080 | 7/1995 |
| WO | WO 00/75255 | 12/2000 |
| WO | WO 2005/003185 A1 | 1/2005 |

OTHER PUBLICATIONS

Schulz, D. N. et al., "Functionally Terminal Polymers via Anionic Methods", Anionic Polymerization; Kinetics, Mechanisms, and Synthesis, ACS Symposium Series 166, (1981), pp. 427-440, vol. 27, American Chemical Society, Washington, D.C.

Ray, W. H., "On the Mathematical Modeling of Polymerization Reactors", Journal of Macromolecular Science—Reviews in Macromolecular Chemistry, (1972), pp. 1-56, vol. C 8, No. 1, Marcel Dekker, Inc.

Billmeyer, Jr., *Textbook of Polymer Science*, (1971), pp. 84-85, 2nd Edition, Wiley-Interscience, New York.

U.S. Appl. No. 11/275,165, Ellis, entitled "Method of Free Radically Polymerizing Vinyl Monomers", filed Dec. 16, 2005.

* cited by examiner

*Primary Examiner* — William K Cheung

(74) *Attorney, Agent, or Firm* — Lisa P. Fulton; James A. Baker

(57) ABSTRACT

A method for the polymerization of free radically polymerizable vinyl monomers involves polymerizing free radically (co)polymerizable vinyl monomers in a batch reaction under essentially adiabatic conditions in the presence of an non-reactive diluent that can remain in the polymer product.

26 Claims, No Drawings

US 7,968,661 B2

METHOD OF FREE RADICALLY POLYMERIZING VINYL MONOMERS

FIELD

This invention relates to a method of free radically polymerizing vinyl monomers in a batch reactor.

BACKGROUND

Polymers of vinyl monomers that are useful, for example, as adhesives can be produced by bulk free-radical polymerization in a batch reactor under essentially adiabatic reaction conditions (see, for example, U.S. Pat. No. 5,986,011). In some situations, it can be advantageous to add solvent to the batch. For example, solvents can be utilized to reduce the heat load in the batch, or to reduce the viscosity of the polymer at the end of the polymerization to facilitate draining or subsequent processing. Typically, any solvent utilized must be removed from the polymer product. For example, after the reaction mixture is drained, an apparatus such as an extractor-extruder can be used to strip any solvent that was added to the batch. Solvent handling can also be expensive because extra equipment may be necessary to capture the solvent for reuse, or other capture methods such as a thermal oxidizers may be required to prevent the solvent from being vented to the atmosphere.

Often, molten polymer product is further processed (for example, to reduce brittleness or increase tackiness) in order to make the product more suitable for its end use by mixing in additives such as plasticizers and tackifiers, for example, while extruding the polymer.

SUMMARY

In view of the foregoing, we recognize that there is a need for methods of making (co)polymers of vinyl monomers wherein the polymerization takes place in the presence of a non-reactive diluent that can remain in the polymer product. Furthermore, we recognize that it would be advantageous if the non-reactive diluent were to modify the properties of the polymer product to make it more suitable for its intended use.

The present invention provides a method of free radically polymerizing vinyl monomers in the presence of a non-reactive diluent that can remain in the polymer product. The method comprises:

(a) providing a non-heterogeneous mixture compromising (i) free radically (co)polymerizable vinyl monomers, (ii) at least one thermal free radical initiator, and (iii) optional non-reactive diluent, in a batch reactor, wherein the mixture comprises less than about 20% by weight dissolved solvent;

(b) deoxygenating the mixture if the mixture is not already deoxygenated;

(c) heating the mixture to a sufficient temperature to generate sufficient initiator radicals from at least one thermal free radical initiator so as to initiate polymerization;

(d) allowing the mixture to polymerize under essentially adiabatic conditions to yield an at least partially polymerized mixture;

(e) adding additionally to the at least partially polymerized mixture at least one thermal free radical initiator;

(f) deoxygenating the partially polymerized mixture if the mixture is not already deoxygenated; and (g) allowing the partially polymerized mixture to further polymerize under essentially adiabatic conditions to yield a further polymerized mixture wherein non-reactive diluent is added additionally to the at least partially polymerized mixture of step (d) if the non-heterogeneous mixture of step (a) does not comprise non-reactive diluent; and wherein non-reactive diluent is optionally added additionally to the at least partially polymerized mixture of step (d) if the non-heterogeneous mixture of step (a) comprises non-reactive diluent.

As used herein, the term "diluent" specifically excludes solvents, for example, volatile solvents such as toluene, ethyl acetate, and acetone, which are typically removed from the polymer product. The term "non-reactive" refers to diluents (or filler) that do not contain free radically reactive ethylenically unsaturated groups that can co-react with the comonomers of the base copolymer, or functionalities that significantly inhibit monomer polymerization or significantly chain transfer during the polymerization of monomers.

The non-reactive diluent can reduce the adiabatic temperature rise during reaction by absorbing a portion of the heat of reaction and therefore reduce the maximum reaction temperature. The vapor pressure and thus the pressure buildup in the reactor is therefore also reduced. In addition, the non-reactive diluent can reduce the viscosity of the melted polymer product. Furthermore, the non-reactive diluent can be, for example, a tackifier or plasticizer (flexibilizer) that can be used to advantageously affect the final properties of the polymer product. In some cases, it is easier to blend a non-reactive diluent into unreacted monomers (for example, because of the lower viscosity), or before the monomers are nearly completely polymerized.

The method of the invention is advantageously carried out in a batch (that is, non-continuous) reactor. Although industrially important, batch reactors are used less frequently for bulk (that is, mass) free-radical polymerization than continuous processes.

Bulk free-radical polymerization of pure monomer typically involves high heat of reaction, increasing solution viscosity as polymerization progresses, and the corresponding decrease in heat transfer coefficient of the reacting material. Because of these problems, controlling the temperature of bulk polymerization processes can be extremely difficult. Bulk free-radical polymerization heat transfer difficulties can often be managed in continuous process. For example, reactive extrusion and continuous static mixer reactors are both useful bulk polymerization processes because of high heat transfer capability due to large heat transfer areas per unit reacting volume.

The prime difficulty with batch reactors is that heat transfer per unit reacting volume is poor and becomes increasingly poor with larger reactor size. But, batch reactors are desirable over continuous reactors in certain circumstances. For example, a specialty chemical manufacturer tends to produce multiple products. In this case, batch reactors can be beneficial because of their multipurpose nature. In addition, the economics of a batch reactor can be favorable over that for a continuous process because of the relative simplicity batch reactor equipment.

With the method of the invention, bulk free radical polymerization of vinyl monomers can be carried out in a batch reactor because the present invention makes use of appropriately chosen free radical initiator(s) and reacting in essentially adiabatic conditions rather than the conventional approach of directly controlling the reaction temperature.

As defined herein, by "essentially adiabatic" it is meant that total of the absolute value of any energy exchanged to or from the batch (that is, the monomer, non-reactive diluent, and optional solvent) during the course of reaction will be less than about 15% of the total energy liberated due to reaction for the corresponding amount of polymerization that has occurred during the time that polymerization has occurred. Expressed mathematically, the essentially adiabatic criterion is:

$$\int_{t_1}^{t_2} \sum_{j=1}^{N} |q_j(t)| dt \le f \cdot \int_{x_1}^{x_2} \Delta H_p(x) dx \qquad (1)$$

where f is about 0.15, $\Delta H_p$ is the heat of polymerization, x=monomer conversion=$(M_O-M)/M_O$ where M is the concentration of the monomer and $M_O$ is the initial monomer concentration, $x_1$ is the polymer fraction at the start of the reaction and $x_2$ is the polymer fraction due to polymerization at the end of the reaction, t is the time. $t_1$ is the time at the start of reaction, $t_2$ is the time at the end of reaction, and $q_j(t)$, wherein j=1 ... N is the rate of energy transferred to the reacting system from the surroundings from all N sources of energy flow into the system. Examples of energy transfer sources for $q_j(t)$, wherein j=1 ... N include, but are not limited to, heat energy conducted to or from the batch from the reactor jacket, energy required to warm internal components in the reaction equipment such as the agitator blades and shaft, and work energy introduced from mixing the reacting mixture. In the practice of the present invention, having f as close to zero as possible is preferred to maintain uniform conditions within a batch during a reaction (that is, maintain homogeneous temperature conditions throughout a batch) which helps to minimize batch-to-batch variations in a particular piece of equipment as well as minimize batch-to-batch variations when reactions are made in batch reactors of differing sizes (that is, uniform scale up or scale down of reaction).

As disclosed herein, when appropriately polymerized, essentially adiabatic bulk free-radical runaway polymerization in a batch reactor can present several advantages: (1) When adiabatically polymerized, because the reaction equipment is not being used to cool the reacting mixture, there is not a significant temperature gradient at the walls of the reaction equipment. Such a temperature gradient can detrimentally broaden the molecular weight distribution of the polymer by making high molecular weight product in the cold boundary layer near the reactor wall, because of the free-radical reaction kinetics well known to those skilled in the art. For example, such high molecular weight components can degrade the coating performance of a hot-melt adhesive. (2) The reaction equipment utilized according to the method of the present invention is simple. (3) Because heat transfer requirements during reaction are eliminated, the method of the present invention more readily scales up from lab-scale equipment to large production-scale equipment than temperature-controlled polymerization methods that rely on available heat transfer area to control reaction temperature. (4) Continuous polymerization reaction equipment contain various degrees of "backmixing" where there is a residence time distribution of the reacting material in the reaction equipment. Some of the reacting material can remain in the reaction equipment for extended periods of time to degrade product performance by continued attack by the free-radical initiator to form cross-linked polymer. Crosslinked gel particles can degrade product performance, such as the coating smoothness of a hot-melt adhesive.

In another aspect, the invention provides a method of free radically polymerizing vinyl monomers in the presence of a filler that can remain in the polymer product. The method comprises:

(a) providing a mixture compromising (i) free radically (co)polymerizable vinyl monomers, (ii) at least one thermal free radical initiator, and (iii) optional filler, in a batch reactor, wherein the mixture comprises less than about 20% by weight dissolved solvent;

(b) deoxygenating the mixture if the mixture is not already deoxygenated;

(c) heating the mixture to a sufficient temperature to generate sufficient initiator radicals from at least one thermal free radical initiator so as to initiate polymerization;

(d) allowing the mixture to polymerize under essentially adiabatic conditions to yield an at least partially polymerized mixture;

(e) adding additionally to the at least partially polymerized mixture at least one thermal free radical initiator;

(f) deoxygenating the partially polymerized mixture if the mixture is not already deoxygenated; and (g) allowing the partially polymerized mixture to further polymerize under essentially adiabatic conditions to yield a further polymerized mixture;

wherein filler is added additionally to the at least partially polymerized mixture of step (d) if the mixture of step (a) does not comprise filler; and wherein filler is optionally added additionally to the at least partially polymerized mixture of step (d) if the mixture of step (a) comprises filler.

The addition of filler can have similar benefits as those described above for the addition of non-reactive diluent (that is, reducing the adiabatic temperature rise during reaction by absorbing a portion of the heat of reaction and therefore reducing the maximum reaction temperature, and easier blending into the monomers or reaction mixture). While it is acknowledged that the presence of filler can render the mixture non-homogeneous, when the volume of monomer phase is in excess compared to the volume of filler particles, the mixture can be considered essentially non-heterogeneous.

As used herein, a "reaction cycle" is defined as a processing sequence where initiator(s), monomers (which are not optional in the first reaction cycle, but which may be optional in subsequent reaction cycles), non-reactive diluent/filler (which are not optional in the first reaction cycle, but which may be optional in subsequent reaction cycles), and optional component(s) are added to the batch followed by one or more essentially adiabatic reactions with optional heating between the essentially adiabatic reactions.

DETAILED DESCRIPTION

Batch Reactor

A batch reactor is used in the method of the present invention. By reacting batch wise is meant that the polymerization reaction occurs in a vessel where product is drained at the end of the reaction, not continuously while reacting. The raw materials can be charged to the vessel at one time prior to reacting, in steps over time while reacting, or continuously over a time period while reacting, and the reaction is allowed to proceed for the necessary amount of time to achieve, in this case, polymer properties including the desired polymerization amount, molecular weight, etc. If necessary, additives can be mixed into the batch prior to draining. When the processing is complete, the product is drained from the reaction vessel.

A typical batch reactor for this invention will comprise a pressure vessel constructed of material suitable for the polymerization, such as stainless steel, which is commonly used for many types of free-radical polymerization. Typically, the pressure vessel will have ports for charging raw materials, removing product, emergency pressure relief, pressurizing the reactor with inert gas, pulling vacuum on the reactor head space, etc. Typically, the vessel is enclosed partially in a jacket through which a heat transfer fluid (such as water) is passed for heating and cooling the contents of the vessel. Typically, the vessel contains a stirring mechanism such as a motor-driven shaft inserted into the vessel to which stirring blades are attached. Commercial batch reaction equipment typically is sized in the range of about 10 to about 20,000 gallons (37.9 to 75,708 liters), and can be custom-built by the user or can be purchased from vendors.

Free-Radically Polymerizable Vinyl Monomers

A variety of free radically polymerizable monomers can be used according to the method of the present invention. Typical monomers applicable for this invention include, but are not limited to, those acrylate monomers commonly used to produce acrylate pressure sensitive adhesives (PSA). The identity and relative amounts of such components are well known to those skilled in the art. Particularly preferred among acrylate monomers are alkyl acrylates, preferably a monofunctional unsaturated acrylate ester of a non-tertiary alkyl alcohol, wherein the alkyl group contains 1 to about 18 carbon atoms. Included within this class of monomers are, for example, isooctyl acrylate, isononyl acrylate, 2-ethylhexyl acrylate, decyl acrylate, dodecyl acrylate, n-butyl acrylate, hexyl acrylate, octadecyl acrylate, 2-methyl butyl acrylate, and mixtures thereof.

Optionally and preferably in preparing a PSA, polar copolymerizable monomers can be copolymerized with the acrylate monomers to improve adhesion of the final adhesive composition to metals and also improve cohesion in the final adhesive composition. Strongly polar and moderately polar copolymerizable monomers can be used.

Strongly polar copolymerizable monomers include but are not limited to these selected from the group consisting of acrylic acid, itaconic acid, hydroxyalkyl acrylates, cyanoalkyl acrylates, acrylamides, substituted acrylamides, and mixtures thereof. A strongly polar copolymerizable monomer preferably constitutes a minor amount, for example, up to about 25 weight % of the monomer, more preferably up to about 15 weight %, of the monomer mixture. When strongly polar copolymerizable monomers are present, the alkyl acrylate monomer generally constitutes a major amount of the monomers in the acrylate-containing mixture, for example, at least about 75% by weight of the monomers.

Moderately polar copolymerizable monomers include, but are not limited to, those selected from the group consisting of N-vinyl pyrrolidone, N,N-dimethyl acrylamide, acrylonitrile, vinyl chloride, diallyl phthalate, and mixtures thereof. A moderately polar copolymerizable monomer preferably constitutes a minor amount, for example, up to about 40 weight %, more preferably from about 5 weight % to about 40 weight %, of the monomer mixture. When moderately polar copolymerizable monomers are present, the alkyl acrylate monomer generally constitutes at least about 60 weight % of the monomer mixture.

Macromonomers are another monomer useful herein. Described in U.S. Pat. No. 4,732,808, incorporated by reference herein, is the use of free-radically copolymerizable macromonomers having the general formula $X-(Y)_n-Z$ wherein X is a vinyl group copolymerizable with other monomer(s) in the reaction mixture;

Y is a divalent linking group; where n can be zero or one; and

Z is a monovalent polymeric moiety having a glass transition temperature, $T_g$, greater than about 20° C., and a weight average molecular weight in the range of about 2,000 to about 30,000 and being essentially unreactive under copolymerization conditions.

These macromonomers are generally used in mixtures with other (co)polymerizable monomer(s). A preferred macromonomer described in U.S. Pat. No. 4,732,808 can be further defined as having an X group which has the general formula

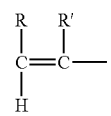

wherein R is a hydrogen atom or a —COOH group and R' is a hydrogen atom or methyl group. The double bond between the carbon atoms provides a copolymerizable moiety capable of copolymerizing with the other monomer(s) in the reaction mixture.

A preferred macromonomer includes a Z group which has the general formula

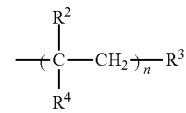

wherein $R^2$ is a hydrogen atom or a lower alkyl group (typically $C_1$ to $C_4$), $R^3$ is a lower alkyl group (typically $C_1$ to $C_4$), n is an integer from 20 to 500 and $R^4$ is a monovalent radical selected from the group consisting of

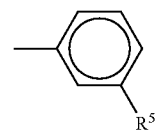

and —$CO_2R^6$ wherein $R^5$ is a hydrogen atom or a lower alkyl group (typically $C_1$ to $C_4$) and $R^6$ is a lower alkyl group (typically $C_1$ to $C_4$).

Preferably, the macromonomer has a general formula selected from the group consisting of

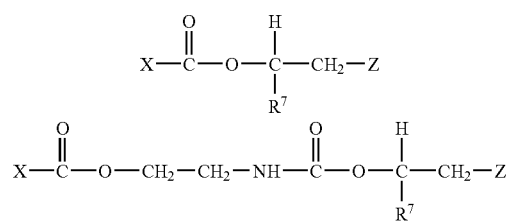

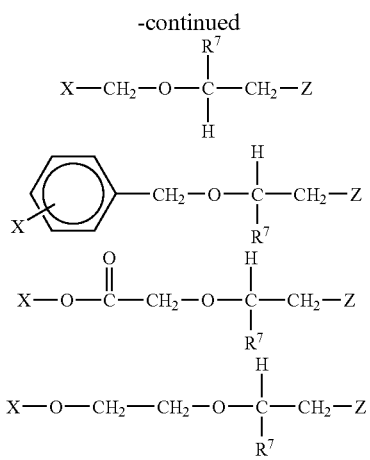

wherein $R^7$ is a hydrogen atom or lower alkyl group (typically $C_1$ to $C_4$).

Preferred macromonomers are functionally terminated polymers having a single functional group (the vinyl group) and are sometimes identified as "semitelechelic" polymers. (Vol. 27 "Functionally Terminal Polymers via Anionic Methods" D. N. Schultz et al., pages 427-440, *Anionic Polymerization*, American Chemical Society [1981].) Such macromonomers are known and may be prepared by the methods disclosed by Milkovich et al. in U.S. Pat. Nos. 3,786,116 and 3,842,059, the disclosures of which are incorporated herein by reference for the description of the preparation of the vinyl-terminated macromonomers. As disclosed therein, vinyl terminated macromonomer is prepared by anionic polymerization of polymerizable monomer to form a living polymer. Such monomers include those having an olefinic group, such as the vinyl-containing compounds. Living polymers are conveniently prepared by contacting the monomer with an alkali metal hydrocarbon or alkoxide salt in the presence of an inert organic solvent which does not participate in or interfere with the polymerization process. Monomers which are susceptible to anionic polymerization are well known. Illustrative species include vinyl aromatic compounds such as styrene, alpha-methyl styrene, vinyl toluene and its isomers or non-aromatic vinyl compounds such as methyl methacrylate. Other monomers susceptible to anionic polymerization are also useful.

The purpose of using a copolymerizable macromonomer includes but is not limited to enabling hot-melt coating of the PSA, but increasing the cohesive strength of the cooled extruded sheet PSA by the interaction of the pendant Z moieties on the polymer backbone. The amount of macromonomer used is generally within the range of about 1% to about 30%, preferably about 1% to about 7%, of the total weight of monomers. The optional use of such macromonomers is included within the scope of the present invention. A particular advantage of the present invention is the ability to successfully copolymerize said macromonomers into the polymer backbone. In conventional, lower-temperature isothermal bulk polymerization, as polymerization proceeds, the macromonomer can precipitate out due to the immiscibility of the macromonomer in the accumulating polymer, preventing the necessary polymerization of the macromonomer into the polymer backbone. In the practice of the present invention, because of the elevated temperatures obtained at high conversion, the successful use of free-radically copolymerizable macromonomers has been demonstrated.

Free-Radical Initiators

Many possible thermal free radical initiators are known in the art of vinyl monomer polymerization and may be used in this invention. Typical thermal free radical polymerization initiators which are useful herein are organic peroxides, organic hydroperoxides, and azo-group initiators which produce free radicals. Useful organic peroxides include but are not limited to compounds such as benzoyl peroxide, di-t-amyl peroxide, t-butyl peroxy benzoate, 2,5-dimethyl-2,5 Di-(t-butylperoxy)hexane, 2,5-dimethyl-2,5-Di-(t-butylperoxy)hexyne-3, and di-cumyl peroxide. Useful organic hydroperoxides include but are not limited to compounds such as t-amyl hydroperoxide and t-butyl hydroperoxide. Useful azo-group initiators include but are not limited to the VAZO™ compounds manufactured by DuPont, such as VAZO™ 52 (2,2'-azobis(2,4-dimethylpentanenitrile)), VAZO™ 64 (2,2'-azobis(2-methylpropanenitrile)), Vazo™ 67 (2,2'-azobis(2-methylbutanenitrile)), and VAZO™ 88 (2,2'-azobis(cyclohexanecarbonitrile)).

When the initiator(s) have been mixed into the monomers, there will be a temperature above which the mixture begins to react substantially (rate of temperature rise typically greater than about 0.1° C./min for essentially adiabatic conditions). This temperature, which depends on factors including the monomer(s) being reacted, the relative amounts of monomer(s), the particular initiator(s) being used, the amounts of initiator(s) used, and the amount of any polymer, non-reactive diluent or filler, and/or any solvent in the reaction mixture, will be defined herein as the "runaway onset temperature". As an example, as the amount of an initiator is increased, its runaway onset temperature in the reaction mixture will decrease. At temperatures below the runaway onset temperature, the amount of polymerization proceeding will be practically negligible. At the runaway onset temperature, assuming the absence of reaction inhibitors and the presence of essentially adiabatic reaction conditions, the free radical polymerization begins to proceed at a meaningful rate and the temperature will start to accelerate upwards, commencing the runaway reaction.

According to the present invention, a sufficient amount of initiator(s) typically is used to carry the polymerization to the desired temperature and conversion. If too much initiator(s) is used, an excess of low molecular weight polymer will be produced thus broadening the molecular weight distribution. Low molecular weight components can degrade the polymer product performance. If too little initiator is used, the polymerization will not proceed appreciably and the reaction will either stop or will proceed at an impractical rate. The amount of an individual initiator used depends on factors including its efficiency, its molecular weight, the molecular weight(s) of the monomer(s), the heat(s) of reaction of the monomer(s), the types and amounts of other initiators included, etc. Typically the total initiator amount used is in the range of about 0.0005 weight % to about 0.5 weight % and preferably in the range of about 0.001 weight % to about 0.1 weight % based on the total weight of monomer(s).

When more than one initiator is used in the reaction, as the first initiator depletes during an essentially adiabatic reaction (with the corresponding increasing reaction temperature), the second initiator may be selected such that it is thermally activated when the first initiator is becoming depleted. That is, as the first initiator is depleting, the reaction has brought the reaction mixture to the runaway onset temperature for the second initiator in the reaction mixture. An overlap is preferred such that before one initiator completely depletes another initiator activates (reaches its runaway onset temperature). Without an overlap, the polymerization rate can slow or essentially stop without external heating to bring the mixture to the runaway onset temperature of the next initiator in the series. This use of external heating defeats one of the benefits of the inventive process by adding the potential for nonuniform temperature distribution in the reaction mixture due to the external heating. However, polymerization still occurs under essentially adiabatic conditions.

Until the temperature increases towards the runaway onset temperature for an individual initiator in the batch, the initiator is essentially dormant, not appreciably decomposing to form free radicals. It will remain dormant until the reaction temperature increases towards its runaway onset temperature in the reaction mixture and/or until external heat is applied.

The succession of one initiator depleting and another reaching its runaway onset temperature can continue as the temperature rises for virtually any number of thermal initiators in the reaction system. In the limit, a succession of virtually an infinite number of different initiators could be used with nearly complete overlap of the active temperature ranges between adjacent initiators in the succession to bring about the polymerization and the corresponding adiabatic temperature rise. In this case, the amount of each initiator used would need to be virtually infinitesimally small so as to not detrimentally broaden the molecular weight distribution.

Practically, to minimize raw material handling requirements, a reasonable minimum number of initiators should be used to achieve the desired amount of adiabatic polymerization and obtain the necessary polymer properties. Typically, 1 to 5 different initiators (more typically 2 to 5) are used during a particular reaction cycle. In some circumstances it may be advantageous to use 2, 3, 4, or 5 different initiators per reaction cycle.

To estimate the amount of overlap between successive initiators in a series during an essentially adiabatic polymerization, standard polymerization modeling techniques can be employed (see, for example, W. H. Ray, "On the Mathematical Modeling of Polymerization Reactors," *J. Macromol. Sci. Macromol. Chem.*, C8(1), 1, 1972).

Alternatively, an essentially adiabatic polymerization can be conducted (for example, using a small-scale adiabatic reaction calorimeter) and the temperature profile can be measured for a particular set of initiators. Based on the known decomposition rates of the initiators and the measured temperature profile, the concentration of each initiator versus time can be calculated. The calculation involves solving the following differential equation for $I_i$ versus time for each initiator i in the essentially adiabatic polymerization (i=1 to n, where n is the number of initiators in the reacting system):

$$\frac{dI_i}{dt} = -k_i I_i$$

Here $I_i$ represents the concentration of initiator i at a given time, t represents time, and $k_i$ is the temperature dependent decomposition rate constant for initiator i. The rate constant $k_i$ is commonly represented by an Arrhenius relationship of the form $k_i = k_{ref,i} \exp\{-E_{a,i}(1/T - 1/T_{ref})/R\}$, where $E_{a,i}$ is the activation energy of the decomposition of initiator i, T is absolute temperature, $k_{ref,i}$ is the decomposition rate coefficient at a chosen reference temperature such as $T_{ref}=294$ K, and R is the Universal gas constant. For clarity, the index i for each initiator will be defined to be numbered 1 through n ordered by lowest temperature to highest temperature for each initiator i which produces a one-hour half life. The constants $E_{a,i}$ and $k_{ref,i}$ can be estimated from knowing the temperature-dependent decomposition characteristics of initiator i, data commonly available from commercial manufacturers of free radical initiators. For example, from knowing the half-life of initiator i at two different temperatures, $E_{a,i}$ and $k_{ref,i}$ can be estimated. Once $I_i$ is calculated versus time, multiplying $I_i$ at each time by $k_i$ at that time can be used to determine $$-\left(\frac{dI_i}{dt}\right)$$

versus time by direct substitution in the rate equation for initiator decomposition. Plotting $$-\left(\frac{dI_i}{dt}\right)$$

versus temperature illustrates the temperature overlap ranges of each initiator.

In the method of the present invention, a preferred minimum and maximum overlap of the active temperature ranges of two or more initiators during an essentially adiabatic reaction will be as follows.

It is preferred that prior to the $$-\left(\frac{dI_i}{dt}\right)$$

for at least one (preferably each) initiator i (i≦n−1, n>1, where i=1, . . . , n) decreasing to about 10% of its maximum value, the value of $$-\left(\frac{dI_{i+1}}{dt}\right)$$

for the next initiator to reach it runaway onset temperature in the series will increase to at least about 20% of its maximum value, as the reaction temperature increases due to essentially adiabatic polymerization. In reacting in this manner, the essentially adiabatic polymerization will proceed without the need for heating between the runaway onset temperatures of the initiators.

It is preferred that prior to the $$-\left(\frac{dI_i}{dt}\right)$$

for at least one (preferably each) initiator i in a series (i>1, n>1, where i=1, . . . , n) reaching about 30% of its maximum value, the previous initiator in the series has already reached its maximum value of $$-\left(\frac{dI_{i-1}}{dt}\right),$$

as the reaction temperature increases due to essentially adiabatic polymerization. In reacting in this manner, the number of initiators used will be kept at a reasonable minimum number.

A particular initiator used is selected based upon its thermal decomposition characteristics. For example, di-cumyl peroxide and di-t-amyl peroxide have similar temperature decomposition characteristics to produce free radicals (that is, similar half-lives at various temperatures) and may be reasonable substitutes for each other in some instances. Apart from the temperature decomposition characteristics, other considerations in initiator selection may include an initiator's toxicity, cost, and potential side reactions in the polymerization system (such as minimizing undesired crosslinking of the polymer).

Typical initiators, in the order that they become activated as the temperature increases, include: Vazo™ 52 (2,2'-azobis(2, 4-dimethylpentanenitrile)), Vazo™ 88 (2,2'-azobis(cyclohexanecarbonitrile)), di-t-amyl peroxide, and t-amyl hydroperoxide. These initiators, for common monomers being reacted, typically are "spaced" in their temperature decomposition characteristics to overlap sufficiently to perform adiabatic polymerization without the need for external heating. Different, or additional, initiators may be necessary, depending on the monomer(s) employed. Factors affecting the initiator(s) employed include but are not limited to the rate of reaction of the monomer(s), the heat of reaction of the monomers, and the heat capacity of the reaction mixture.

In the case that there will be more than one reaction cycle, the initiator(s) for the first essentially adiabatic reaction cycle are typically selected to bring the reaction to a temperature/conversion level where the polymerization reaction virtually stops when the initiator(s) have essentially depleted (that is, initiator(s) are more than 99% depleted) and where the solution viscosity is such that when the reaction mixture is cooled prior to the next reaction cycle, the next initiator(s), optional chain transfer agent, optional additional monomers, optional polymer, etc., can be mixed into the batch. This viscosity will be typically less than about 200,000 centipoise (Brookfield viscosity at mixing temperature) for a common batch reactor system.

Non-Reactive Diluent/Filler

Non-reactive diluent or fillers are used in the methods of the invention to reduce the adiabatic temperature rise during reaction by absorbing a portion of the heat of reaction. Non-reactive diluents may also reduce the viscosity of the melted polymer product and/or advantageously affect the final properties of the polymer product. Advantageously, the non-reactive diluent or filler can remain in the polymer product in its usable form.

Suitable non-reactive diluents are non-volatile (that is, they remain present and stable under polymerization and processing conditions) and are compatible (miscible) in the mixture. "Non-volatile" diluents typically generate less than 3% VOC (volatile organic content) during polymerization and processing. The term "compatible" refers to diluents that exhibit no gross phase separation from the base copolymer when blended in the prescribed amounts, and that, once mixed with the base copolymer, do not significantly phase separate from the base copolymer upon aging. Non-reactive diluents include, for example, materials which can raise or lower the glass transition temperature (Tg) of the polymer product, including tackifiers such as synthetic hydrocarbon resins and plasticizers such as phthalates. The non-reactive diluent can also serve as a non-volatile "solvent" for incompatible mixtures of comonomers. Such incompatible comonomer mixtures typically require a volatile reaction medium, such as an organic solvent to promote effective copolymerization. Unlike volatile reaction media, the non-reactive diluent does not have to be removed from the polymer product.

Preferred non-reactive diluents include plasticizers (flexibilizers) and tackifiers. Appropriate amounts of non-reactive diluent will be familiar to those skilled in the art, and will depend upon numerous factors including, for example, the monomer(s) utilized, the type of non-reactive diluent, and the end use of the polymer product. Typically, however, the amount of non-reactive diluent used is less than about 50% by weight, based upon the total weight of the reaction mixture.

Useful plasticizers include, for example, polyalkylene oxides having weight average molecular weights of 150 to about 5,000, or 150 to 1,500, such as polyethylene oxides, polypropylene oxides, polyethylene glycols; alkyl or aryl functionalized polyalkylene oxides, such as that commercially available from ICI Chemicals under the trade designation "PYCAL 94" (a phenyl ether of polyethylene oxide); monomethyl ethers of polyethylene oxides; monomeric adipates such as dioctyl adipate, dibutyl adipate, dibutoxyethoxyethyl adipate, and dibutoxypropoxypropyl adipate; polymeric adipates such as polyester adipates; citrates such as acetyltri-n-butyl citrate; phthalates such as butyl benzylphthalates, dibutyl phthalate, diisoctyl phthalate; trimellitates; sebacates such as dibutylsebacate; myristates such as isopropyl myristate; polyesters such as those commercially available from C.P. Hall Co. under the trade designation "PARAPLEX"; phosphate esters such as those commercially available from Monsanto under the trade designation "SANTICIZER" (for example, 2-ethylhexyl diphenylphosphate and t-butylphenyl diphenylphosphate); glutarates such as that commercially available form C.P. Hall Co. under the trade designation "PLASTHALL 7050" (a dialkyl diether glutarate); other polymeric plasticizing agents such as polyurethanes, polyureas, polyvinylethers, polyethers, polyacrylates; and mixtures thereof. Preferred plasticizers include, for example, dioctyl phthalate, phosphate esters, and alkyl or aryl functionalized polyalkylene oxides.

Typically, plasticizer will added at a level of about 1% to about 50% by weight (preferably, about 1% to about 25% by weight), based upon the total weight of the reaction mixture.

Useful tackifiers include, for example, terpene phenolics, rosins, rosin esters, esters of hydrogenated rosins, synthetic hydrocarbon resins and combinations thereof. Preferred tackifiers include, for example, esters of hydrogenated rosins and synthetic hydrocarbon resins. Typically, tackifier will added at a level of about 1% to about 50% by weight (preferably, about 10% to about 40% by weight), based upon the total weight of the reaction mixture.

Useful fillers are non-reactive such that they do not contain free radically reactive ethylenically unsaturated groups that can co-react with the comonomers of the base copolymer, or functionalities that significantly inhibit monomer polymerization or significantly chain transfer during the polymerization of monomers. Fillers can, for example, be used to reduce the cost of the final polymer formulation.

Useful fillers include, for example, clay, talc, dye particles and colorants (for example, $TiO_2$ or carbon black), glass beads, metal oxide particles, silica particles, and surface-treated silica particles (such as Aerosil R972 available from Degussa Corporation, Parsippany, N.J.). The filler can also comprise conductive particles (see, for example, U.S. Patent Application Pub. No. 2003/0051807) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal or the like. Preferred fillers include, for example, hydrophobic fumed silica particles, electrically conductive particles, and metal oxide particles.

Appropriate amounts of filler will be familiar to those skilled in the art, and will depend upon numerous factors including, for example, the monomer(s) utilized, the type of filler, and the end use of the polymer product. Typically, filler will be added at a level of about 1% to about 50% by weight (preferably, about 2% to about 25% by weight), based upon the total weight of the reaction mixture.

Chain Transfer Agents

Chain transfer agents, which are well known in the polymerization art, may also be included to control the molecular weight or other polymer properties. The term "chain transfer agent" as used herein also includes "telogens". Suitable chain transfer agents for use in the inventive process include but are not limited to those selected from the group consisting of carbon tetrabromide, hexanebromoethane, bromotrichloromethane, 2-mercaptoethanol, t-dodecylmercaptan, isooctylthioglycoate, 3-mercapto-1,2-propanediol, cumene, and mixtures thereof. Depending on the reactivity of a particular chain transfer agent and the amount of chain transfer desired, typically 0 to about 5 percent by weight of chain transfer agent is used, preferably 0 to about 0.5 weight percent, based upon the total weight of monomer(s).

Crosslinking

Crosslinking may also be used in the method of the invention. For example, in the art of hot-melt PSA manufacture, PSAs often require a curing step after they have been extruded in sheet form in order to give them good bond strength and toughness. This step, known as post curing, usually comprises exposing the extruded sheet to some form of radiant energy, such as electron beam, or ultraviolet light with the use of a chemical crosslinking agent.

Examples of suitable crosslinking agents include but are not limited to those selected from the groups consisting of hydrogen abstraction type photocrosslinkers such as those based on benzophenones, acetophenones, anthraquinones, and the like. These crosslinking agents can be copolymerizable or non-copolymerizable.

Examples of suitable non-copolymerizable hydrogen abstraction crosslinking agents include benzophenone, anthraquinones, and radiation-activatable crosslinking agents such as those described in U.S. Pat. No. 5,407,971. Such agents have the general formula

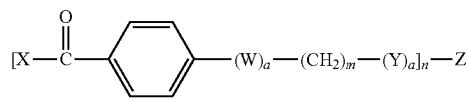

wherein W represents —O—, —N—, or —S—; X represents CH$_3$— or phenyl; Y represents a ketone, ester, or amide functionality; Z represents a polyfunctional organic segment that contains no hydrogen atoms more photoabstractable than hydrogen atoms of a polymer formed using the crosslinking agent; m represents an integer from 0 to 6; "a" represents 0 or 1; and n represents an integer 2 or greater. Depending on the amount of crosslinking desired and the efficiency of the particular crosslinker used, non-copolymerizable crosslinking agents are typically included in the amount of about 0% to about 10%, and preferred in the range of about 0.05% to about 2%, based on total weight of the monomer(s).

Examples of suitable copolymerizable hydrogen abstraction crosslinking compounds include mono-ethylenically unsaturated aromatic ketone monomers free of orthoaromatic hydroxyl groups.

Examples of suitable free-radically copolymerizable crosslinking agents include but are not limited to those selected from the group consisting of 4-acryloxybenzophenone (ABP), para-acryloxyethoxybenophenone, and para-N-(methacryloxyethyl)-carbamoylethoxybenophenone. Copolymerizable chemical cross linking agents, are typically included in the amount of about 0% to about 2%, and preferred in the amount of about 0.025% to about 0.5%, based on the total weight of monomer(s). Other useful copolymerizable crosslinking agents are described in U.S. Pat. No. 4,737,559.

Solvents

In many cases, free-radical polymerization can take place without solvents, that is, true bulk polymerization where the polymer formed as well as the monomers themselves all being miscible. However, the monomers may in some cases require a solvent in order to (co)polymerize. For example, acrylamides are dissolved in a small amount of solvent in order to make them miscible with isooctyl acrylate. Therefore, the inventive process includes within its scope the use of solvents that are nonreactive in the free radical polymerization being carried out. Such solvents usually comprise less than about 20 weight percent based on the total weight of the mixture. Useful solvents are those that are miscible in the mixture including but not limited to organic solvents such as toluene, hexane, pentane, and ethyl acetate. Solvents may also enhance the inventive process, so as to reduce the viscosity of the polymer at the end of the polymerization to facilitate draining or subsequent processing. Typically, however, solvent must be removed from the end product.

Optional Polymer

Optionally, polymer may be dissolved in the reaction mixture prior to the first essentially adiabatic reaction cycle. Alternatively and/or in addition the optional polymer may be included in subsequent essentially adiabatic reaction cycles. Such polymer may be included to modify the molecular weight distribution, molecular weight, or properties of the final polymer product after reacting is complete and generally will be non-reactive during the polymerization of the inventive process. Although it is not required, the polymer generally will be composed of the same monomer(s) as that to be reacted in the reaction mixture comprising the polymer, monomer(s), initiator(s), optional chain transfer agent(s), etc. Polymer dissolved in the monomer(s) prior to the first reaction cycle typically will be included in the range of about 0% to about 50% by weight and preferably less than about 0% to about 30% by weight, based on total weight of monomer(s) plus polymer. The use of polymer syrups to make acrylic polymers is explained, for example, in U.S. Pat. No. 4,181,752.

Method

Typical reaction(s) with the inventive process proceed as follows. The monomer(s) are charged to the reactor in the desired amount(s). The temperature of the reaction vessel must be cool enough so that virtually no thermal polymerization of the monomer(s) will occur and also cool enough so that virtually no polymerization will occur when the initiator(s) are added to the batch. Also, care should be taken to ensure the reactor is dry, in particular, free of any undesired volatile solvent (such as reactor cleaning solvent), which potentially could dangerously elevate the pressure of the reaction vessel as the temperature increases due to heat of polymerization. The initiator(s), optional non-reactive diluent or filler, optional chain transfer agents, optional polymer, optional crosslinking agents, optional solvent, etc., are also charged to the reactor.

Prior to warming the reaction mixture as described below (or optionally simultaneously while warming the batch), after adding the components to the batch as described above, the batch is purged of oxygen. De-oxygenation procedures are well known to those skilled in the art of free-radical polymerization. For example, de-oxygenation can be accomplished by bubbling an inert gas such as nitrogen through the batch to displace dissolved oxygen. The non-reactive diluent or filler can also be added at this point if it was not added in the initial charge to the reactor, or in addition to non-reactive diluent or filler added in the initial charge to the reactor.

After completing the de-oxygenation, the head space in the reactor is typically pressurized with an inert gas such as nitrogen to a level necessary to suppress boiling of the reaction mixture as the temperature rises during reaction. The inert gas pressure also prevents oxygen from entering the polymerization mixture through possible small leaks in the reaction equipment while polymerization is in progress.

From heating provided by a jacket on the reactor, the reaction mixture temperature typically is raised to or in a range about 1° C. to about 5° C. above the runaway onset temperature with sufficient mixing in the batch to have an essentially uniform temperature in the batch. A batch temperature controller is typically set temporarily to maintain the batch at the runaway onset temperature. Once the jacket temperature begins to drop as necessary to hold the batch at the runaway onset temperature, this indicates that the polymerization has begun. The reaction may not proceed immediately when the batch is brought to the runaway onset temperature because it may take time to deplete reaction inhibitors that are typically shipped with the monomer (to prevent unwanted polymerization during shipping and handling), other trace impurities, or any oxygen still dissolved in the reaction mixture. As soon as the jacket temperature drops, the reactor jacket temperature control system is typically set to track the batch temperature as it increases, due to reaction, to facilitate essentially adiabatic reaction conditions. In the practice of the inventive process, it has been found beneficial to have the jacket track about 1° C. to about 10° C. above the batch to warm the reactor walls from the jacket as opposed to warming the reactor walls from the heat of reaction of the mixture, making the reacting system more adiabatic. It is acknowledged that perfect adiabiticity is probably not attainable because there will typically be a small amount of heat transferred from the reacting medium to the internal agitator blades and shaft as well as the mixing baffles in the reactor. In the practice of this invention the effect of heat loss to heating the agitator shaft and blades, baffles, temperature probes, etc., has been found to be negligible.

An alternate heating approach can be to gently warm the batch past the runaway onset temperature with heat input from the jacket to warm the batch at a rate of about 0.1° C./min to about 0.5° C./min and continue the heating through the reaction cycle (similar to the heating approach above with the jacket tracking about 1° C. to about 10° C. above the batch temperature). As in the heating approach above, continued heating through the reaction cycle would serve to offset the heat loss to the reaction equipment and maintain essentially adiabatic reaction conditions.

Once the reaction temperature has peaked, due to the depletion of the thermal initiator(s) as well as negligible reaction of the monomers from thermal polymerization, the polymer content at this point is typically about 30-80% by weight based on the total weight of monomer(s) and polymer.

The polymerization cycle can be stopped at this point. Typically, the batch temperature is cooled prior to beginning the next reaction cycle. Generally the batch is cooled about 0-20° C. below the runway onset temperature of the initiator used in the next reaction cycle. If more than one initiator is used the batch temperature is typically cooled at least about 0-20° C. below the runaway onset temperature of the initiator having the lowest runaway onset temperature.

As the partially polymerized reaction mixture cools, its viscosity will increase. Optionally, if necessary, additional monomer(s) can be added to the batch before it has fully cooled to compensate for the increasing viscosity. Typically, if necessary, a relatively small amount will be added. Charging additional monomer in the amount less than about 30 weight % of the amount of monomer added in the first reaction cycle is preferred. While the batch is cooling or when it has cooled to the desired temperature, optionally more monomer(s) can be added to adjust monomer ratios to compensate for unequal reactivity ratios of the monomers in the previous reaction cycle. Similarly, monomer(s) not included in an earlier reaction cycle can be added to tailor the polymer properties as needed. Monomer addition may also be performed as an in-process correction to compensate for slight batch-to-batch variations in the amount of reaction conversion obtained in a previous reaction cycle.

When the batch has cooled to the desired temperature, the additional initiator(s) are added to the batch. Optionally, additional chain transfer agent(s) can be added. Adjusting the amount of chain transfer agent can provide an in-process correction for the product molecular weight obtained from the previous reaction cycle. Other additives, including optional photocrosslinking agents, optional polymer, optional solvent, etc., can also be added at this time.

The batch is de-oxygenated, warmed to the runway onset temperature of the initiator having the lowest runaway onset temperature, and reacted essentially adiabatically as described above for the previous reaction cycle. If necessary, additional reaction cycles can be performed to continue increasing conversion to the desired level.

Optionally additives including but not limited to those selected from the group consisting of plasticizers, tackifiers, antioxidants, stabilizers, fillers, and mixtures thereof, can be added at this time by mixing one or more of them into the molten polymer product. The identity and relative amounts of such components are well known to those skilled in the art. For example, the antioxidant/stabilizer Irganox™ 1010 (tetrakis(methylene(3,5-di-tert-butyl-4-hydroxyhydrocinnamate))methane), manufactured by Ciba-Geigy Corporation, can be mixed into the polymer to increase the temperature stability of the polymer. Antioxidant is typically used in the range of about 0.01% to about 1.0% based on the total weight of the polymer product.

The reaction mixture's viscosity at the temperature at the end of the final reaction cycle is preferably less than about 200,000 to about 500,000 centipoise (Brookfield viscosity at draining temperature) to permit draining of the molten polymer from the reactor and optionally mixing additives into the batch. Typically, inert gas (such as nitrogen) pressure in the head space of the reactor can be used to hasten the draining of the product from the reactor.

After the reaction mixture is drained, an apparatus such as an extractor-extruder can be used to strip unreacted monomer and/or any solvent that optionally was added to the batch, or further process the polymer by mixing in additives comprising plasticizers, tackifiers, antioxidants and/or stabilizers, and extruding the polymer into the physical form that it is intended to be used (i.e. in sheet form for a PSA).

EXAMPLES

Objects and advantages of this invention are further illustrated by the following examples, but the particular materials and amounts thereof recited in these examples, as well as other conditions and details, should not be construed to unduly limit this invention.

The polymerization of various monomers as further described in the presence of dioctyl phthalate (DOP) in different amounts was carried out by a two step reaction using a VSP2 adiabatic reaction apparatus equipped with a 316 stainless steel test can (available from Fauske and Associates Inc, Burr Ridge Ill.). The test methods, materials used, and reaction details are described below.

Materials

| Designator | Name | Availability |
|---|---|---|
| VAZO 52 | 2,2'-azobis(2,4 dimethylpentanenitrile) | Dupont, Wilmington, DE |
| VAZO 88 | 2,2'-azobis(cyclohexanecarbonitrile) | Dupont, Wilmington, DE |
| IRGANOX 1010 | tetrakis(methylene(3,5-di-tert-butyl-4-hydroxyhydrocinnamate))methane | Ciba Specialty Chemicals, Tarrytown, NY |
| LUPERSOL 101 | 2,5-dimethyl-2,5 Di-(t-butylperoxy)hexane | Elf Atochem, Philadelphia, PA |
| LUPERSOL 130 | 2,5-dimethyl-2,5-Di-(t-butylperoxy)hexyne-3 | Elf Atochem, Philadelphia, PA |
| AA | Acrylic Acid | Dow Chemical, Midland, MI |
| EA | Ethyl acrylate | Dow Chemical, Midland, MI |
| MA | Methyl acrylate | Dow Chemical, Midland, MI |
| IOA | Isooctyl acrylate | 3M Company, St. Paul, MN |
| ABP | 4-acryloxy benzophenone | Prepared according to U.S. Pat. No. 4,737,559 |
| IOTG | Isooctylthioglycoate | Dow Chemical, Midland, MI |
| NVP | 1-ethenyl-2-pyrrolidone | International Specialty Products, Wayne, NJ |
| VA | Vinyl acetate | Celanese, Dallas, TX |
| BA | Butyl acrylate | Dow Chemical, Midland, MI |
| DOP | Dioctyl phthalate | Sunoco, Inc. Philadelphia, PA |
| MMA | Methyl methacrylate | Rohm and Haas, Philadelphia, PA |
|  | Ethyl acetate | EMD Chemicals, Inc. Gibbstown, NJ |
| MEHQ | 4-methoxyphenol | Sigma-Aldrich, St. Louis, MO |

Solids Measurement Test Method

About 0.5-1.0 gm of polymer sample was placed in a small tin. The polymer-containing tin was placed in a convection oven at 120-130° C. for at least three hours, or until weight loss by evaporation could not be measured any longer. By the measured weight loss of evaporated monomer, the amount of monomer converted to polymer can be calculated (expressed in percent in the examples below).

Inherent Viscosity Test Method

The inherent viscosities (IV) reported herein were obtained by conventional methods used by those skilled in the art. The IVs were obtained using a Cannon-Fenske #50 viscometer in a water bath controlled at 25° C., to measure the flow time of 10 ml of a polymer solution (0.2 g per deciliter polymer in ethyl acetate). The test procedure followed and the apparatus used are described in detail in *Textbook of Polymer Science*, F. W. Billmeyer, Wiley-Interscience, Second Edition, 1971, Pages 84 and 85.

Glass Transition Temperature (Tg) Measurement Test Method

Differential scanning calorimetry to determine Tg was carried out by testing 10 milligram samples in a Perkins Elmer DSC7 (Boston, Mass.), scanning from −120° C. to 120° C. at 20° C./min.

Example 1

EA/BA/NVP/AA 61/25/10/4 (Monomer/DOP 80/20)

In the first step of the polymerization, the VSP2 reactor test can was charged with 74 grams of a mixture consisting of 0.10 grams IRGANOX 1010; 59.80 grams EA; 25.00 grams BA; 10.00 grams NVP; 4.00 grams AA; 2.40 grams of a mixture consisting of 0.10 grams VAZO 52 and 80.00 grams ethyl acetate; 0.85 grams of a mixture consisting of 5.00 grams IOTG and 80.00 grams EA; 0.42 grams of a mixture consisting of 2.00 grams MEHQ and 40.00 grams EA; 0.20 grams ABP (25% by weight in ethyl acetate); 25.00 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 155 degrees C. When the reaction was complete, the mixture was cooled to below 50 degrees C. The reaction product had a solids level of 52.1% and an IV of 0.36.

To 70.00 grams of the reaction product of the first step was added 0.56 grams of a mixture consisting of 1.25 grams IOTG, 0.5 grams VAZO 52, 0.20 grams VAZO 88, 0.15 grams LUPERSOL 101, 0.40 grams LUPERSOL 130, 47.50 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 190 degrees C. The final polymer/DOP had a solids level of 96.3% and an IV of 0.36.

Example 2

EA/BA/NVP/AA 61/25/10/4 (Monomer/DOP 75/25)

In the first step of the polymerization, the VSP2 reactor test can was charged with 74.00 grams of a mixture consisting of 0.10 grams IRGANOX 1010; 59.80 grams EA; 25.00 grams BA; 10.00 grams NVP; 4.00 grams AA; 2.40 grams of a mixture consisting of 0.10 grams VAZO 52 and 80.00 grams ethyl acetate; 0.85 grams of a mixture consisting of 5.00 grams IOTG and 80.00 grams EA; 0.42 grams of a mixture consisting of 2.00 grams MEHQ and 40.00 grams EA; 0.20 grams ABP (25% by weight in ethyl acetate); 33.30 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 150 degrees C. When the reaction was complete, the mixture was cooled to below 50 degrees C.

To 70.00 grams of the reaction product of the first step was added 0.56 grams of a mixture consisting of 1.25 grams IOTG, 0.50 grams VAZO 52, 0.20 grams VAZO 88, 0.15 grams LUPERSOL 101, 0.40 grams LUPERSOL 130, 47.50 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 173 degrees C. The final polymer/DOP had a solids level of 92.9% and an IV of 0.34.

Example 3

IOA/MA/NVP/AA 55/30/10/5 (Monomer/DOP 85/15)

In the first step of the polymerization, the VSP2 reactor test can was charged with 74.00 grams of a mixture consisting of 0.10 grams IRGANOX 1010; 50.60 grams IOA; 30.00 grams MA; 10.00 grams NVP; 5.00 grams AA; 3.20 grams of a mixture consisting of 0.10 grams VAZO 52 and 80.00 grams IOA; 0.85 grams of a mixture consisting of 5.00 grams IOTG and 80.00 grams IOA; 0.42 grams of a mixture consisting of 2.00 grams MEHQ and 40.00 grams IOA; 0.20 grams ABP (25% by weight in ethyl acetate); 17.75 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 153 degrees C. When the reaction was complete, the mixture was cooled to below 50 degrees C. The reaction product had a solids level of 51.8% and an IV of 0.38.

To 70.00 grams of the reaction product of the first step was added 0.56 grams of a mixture consisting of 1.25 grams IOTG, 0.5 grams VAZO 52, 0.20 grams VAZO 88, 0.15 grams LUPERSOL 101, 0.60 grams LUPERSOL 130, 47.30 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 181 degrees C. The final polymer/DOP had a solids level of 93.4% and an IV of 0.37. The glass transition temperature of the final product as measured by differential scanning calorimetry (DSC) was found to be −42.9 deg C.

Example 4

IOA/MA/NVP/AA 48/35/15/2 (Monomer/DOP 85/15)

In the first step of the polymerization, the VSP2 reactor test can was charged with 74.00 grams of a mixture consisting of 0.10 grams IRGANOX 1010; 43.60 grams IOA; 35.00 grams MA; 15.00 grams NVP; 2.00 grams AA; 3.20 grams of a mixture consisting of 0.01 grams VAZO 52 and 80.00 grams IOA; 0.85 grams of a mixture consisting of 5.00 grams IOTG and 80.00 grams IOA; 0.42 grams of a mixture consisting of 2.00 grams MEHQ and 40.00 grams IOA; 0.20 grams ABP (25% by weight in ethyl acetate); 17.75 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 158 degrees C. When the reaction was complete, the mixture was cooled to below 50 degrees C. The reaction product had a solids level of 52.7% and an IV of 0.43.

To 70.00 grams of the reaction product of the first step was added 0.56 grams of a mixture consisting of 1.25 grams IOTG, 0.50 grams VAZO 52, 0.20 grams VAZO 88, 0.15 grams LUPERSOL 101, 0.60 grams LUPERSOL 130, 47.30 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 179 degrees C. The final polymer/DOP had a solids level of 93.4% and an IV of 0.43. The glass transition temperature of the final product as measured by differential scanning calorimetry (DSC) was found to be −25.3 deg C.

Example 5

EA/MA/NVP/AA 48/30/20/2 (Monomer/DOP 85/15)

In the first step of the polymerization, the VSP2 reactor test can was charged with 74.00 grams of a mixture consisting of 0.10 grams IRGANOX 1010; 43.60 grams IOA; 30.00 grams MA; 20.00 grams NVP; 2.00 grams AA; 3.20 grams of a mixture consisting of 0.10 grams VAZO 52 and 80.00 grams IOA; 0.85 grams of a mixture consisting of 5.00 grams IOTG and 80.00 grams IOA; 0.42 grams of a mixture consisting of 2.00 grams MEHQ and 40.00 grams IOA; 0.20 grams ABP (25% by weight in ethyl acetate); 17.75 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 161 degrees C. When the reaction was complete, the mixture was cooled to below 50 degrees C. The reaction product had a solids level of 53.7% and an IV of 0.41.

To 70.00 grams of the reaction product of the first step was added 0.56 grams of a mixture consisting of 1.25 grams IOTG, 0.50 grams VAZO 52, 0.20 grams VAZO 88, 0.15 grams LUPERSOL 101, 0.60 grams LUPERSOL 130, 47.30 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 184 degrees C. The final polymer/DOP had a solids level of 92.5% and an IV of 0.44. The glass transition temperature of the final product as measured by differential scanning calorimetry (DSC) was found to be −15.6 deg C.

Example 6

IOA/MMA/NVP/AA 55/30/10/5 (Monomer/DOP 85/15)

In the first step of the polymerization, the VSP2 reactor test can was charged with 74.00 grams of a mixture consisting of 0.10 grams IRGANOX 1010; 50.60 grams IOA; 30.00 grams MMA; 10.00 grams NVP; 5.00 grams AA; 3.20 grams of a mixture consisting of 0.10 grams VAZO 52 and 80.00 grams IOA; 0.85 grams of a mixture consisting of 5.00 grams IOTG and 80.00 grams IOA; 0.42 grams of a mixture consisting of 2.00 grams MEHQ and 40.00 grams IOA; 0.20 grams ABP (25% by weight in ethyl acetate); 17.75 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 111 degrees C. When the reaction was complete, the mixture was cooled to below 50 degrees C. The reaction product had a solids level of 33.7% and an IV of 0.39.

To 70.00 grams of the reaction product of the first step was added 0.56 grams of a mixture consisting of 1.25 grams IOTG, 0.50 grams VAZO 52, 0.20 grams VAZO 88, 0.15 grams LUPERSOL 101, 0.60 grams LUPERSOL 130, 47.30 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 201 degrees C. The final polymer/DOP had a solids level of 92.7% and an IV of 0.36. The glass transition temperature of the final product as measured by differential scanning calorimetry (DSC) was found to be −32.7 deg C.

Example 7

IOA/MA/VA/NVP/AA 35/20/30/10/5
(Monomer/DOP 85/15)

In the first step of the polymerization, the VSP2 reactor test can was charged with 74.00 grams of a mixture consisting of 0.10 grams IRGANOX 1010; 30.60 grams IOA; 20.00 grams MA; 30.00 grams VA; 10.00 grams NVP; 5.00 grams AA; 3.20 grams of a mixture consisting of 0.10 grams VAZO 52 and 80.00 grams IOA; 0.85 grams of a mixture consisting of 5.00 grams IOTG and 80.00 grams IOA; 0.42 grams of a mixture consisting of 2.00 grams MEHQ and 40.00 grams IOA; 0.20 grams ABP (25% by weight in ethyl acetate); 17.75 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 178 degrees C. When the reaction was complete, the mixture was cooled to below 50 degrees C. The reaction product had a solids level of 49.3% and an IV of 0.29.

To 70.00 grams of the reaction product of the first step was added 0.56 grams of a mixture consisting of 1.25 grams IOTG, 0.50 grams VAZO 52, 0.20 grams VAZO 88, 0.15 grams LUPERSOL 101, 0.60 grams LUPERSOL 130, 47.30 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 178 degrees C. The final polymer/DOP had a solids level of 91.0% and an IV of 0.36. The glass transition temperature of the final product as measured by differential scanning calorimetry (DSC) was found to be −8.7 deg C.

Example 8

IOA/MA/MMA/AA 45/25/25/5 (Monomer/DOP 85/15)

In the first step of the polymerization, the VSP2 reactor test can was charged with 74.00 grams of a mixture consisting of 0.10 grams IRGANOX 1010; 40.60 grams IOA; 25.00 grams MA; 25.00 grams MMA; 5.00 grams AA; 3.20 grams of a mixture consisting of 0.10 grams VAZO 52 and 80.00 grams IOA; 0.85 grams of a mixture consisting of 5.00 grams IOTG and 80.00 grams IOA; 0.42 grams of a mixture consisting of 2.00 grams MEHQ and 40.00 grams IOA; 0.2 grams ABP (25% by weight in ethyl acetate); 17.75 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 106 degrees C. When the reaction was complete, the mixture was cooled to below 50 degrees C. The reaction product had a solids level of 36.9% and an IV of 0.53.

To 70.00 grams of the reaction product of the first step was added 0.56 grams of a mixture consisting of 1.25 grams IOTG, 0.5 grams VAZO 52, 0.20 grams VAZO 88, 0.15 grams LUPERSOL 101, 0.60 grams LUPERSOL 130, 47.30 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 215 degrees C. The final polymer/DOP had a solids level of 92.5% and an IV of 0.41. The glass transition temperature of the final product as measured by differential scanning calorimetry (DSC) was found to be −43.7 deg C. 0

Example 9

IOA/VA/NVP/AA 55/30/10/5 (Monomer/DOP 85/15)

In the first step of the polymerization, the VSP2 reactor test can was charged with 74.00 grams of a mixture consisting of 0.10 grams IRGANOX 1010; 50.60 grams IOA; 30.00 grams VA; 10.00 grams NVP; 5.00 grams AA; 3.20 grams of a mixture consisting of 0.10 grams VAZO 52 and 80.00 grams IOA; 0.85 grams of a mixture consisting of 5.00 grams IOTG and 80.00 grams IOA; 0.42 grams of a mixture consisting of 2.00 grams MEHQ and 40.00 grams IOA; 0.20 grams ABP (25% by weight in ethyl acetate); 17.75 grams DOP. The reactor was sealed and purged of oxygen and then held at 100 psig (793 kPa) nitrogen pressure. The reaction mixture was heated to 60 degrees C. and the reaction proceeded adiabatically. The reaction peak temperature was about 142 degrees C. When the reaction was complete, the mixture was cooled to below 50 degrees C. The reaction product had a solids level of 52.6% and an IV of 0.28.

To 70 grams of the reaction product of the first step was added 0.56 grams of a mixture consisting of 1.25 grams IOTG, 0.50 grams VAZO 52, 0.20 grams VAZO 88, 0.15 grams LUPERSOL 101, 0.60 grams LUPERSOL 130, 47.30 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 145 degrees C. The final polymer/DOP had a solids level of 87.7% and an IV of 0.35. The glass transition temperature of the final product as measured by differential scanning calorimetry (DSC) was found to be −47 deg C.

Comparative Example 1

IOA/VA/NVP/AA 55/30/10/5 (No diluent)

In the first step of the polymerization, the VSP2 reactor test can was charged with 74.00 grams of a mixture consisting of 0.10 grams IRGANOX 1010; 50.60 grams IOA; 30.00 grams VA; 10.00 grams NVP; 5.00 grams AA; 3.20 grams of a mixture consisting of 0.10 grams VAZO 52 and 80.00 grams IOA; 0.85 grams of a mixture consisting of 5.00 grams IOTG and 80.00 grams IOA; 0.42 grams of a mixture consisting of 2.00 grams MEHQ and 40.00 grams IOA; 0.20 grams ABP (25% by weight in ethyl acetate). The reactor was sealed and purged of oxygen and then held at 100 psig (793 kPa) nitrogen pressure. The reaction mixture was heated to 60 degrees C.

and the reaction proceeded adiabatically. The reaction peak temperature was about 147 degrees C. When the reaction was complete, the mixture was cooled to below 50 degrees C. The reaction product had a solids level of 41.0% and an IV of 0.38.

To 70.00 grams of the reaction product of the first step was added 0.56 grams of a mixture consisting of 1.25 grams IOTG, 0.5 grams VAZO 52, 0.20 grams VAZO 88, 0.15 grams LUPERSOL 101, 0.60 grams LUPERSOL 130, 47.30 grams ethyl acetate; 0.34 grams ABP solution (25% by weight in ethyl acetate). The reactor was sealed and purged of oxygen and held at 100 psig (793 kPa) nitrogen pressure. The reaction mixture was heated to 55 degrees C. and the reaction proceeded adiabatically. Reaction peak temperature was about 151 degrees C. The final polymer/DOP had a solids level of 81.4% and an IV of 0.43. The glass transition temperature of the final product as measured by differential scanning calorimetry (DSC) was found to be −38.9 deg C.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A method of free radically polymerizing vinyl monomers comprising:
   (a) providing a non-heterogeneous mixture compromising:
      (i) free radically (co)polymerizable vinyl monomers,
      (ii) at least one thermal free radical initiator, and
      (iii) non-reactive non-volatile diluent generating less than 3% volatile organic content during polymerization and processing in a batch reactor, wherein the non-heterogeneous mixture further comprises a miscible solvent nonreactive in the free radical polymerization, wherein the miscible solvent nonreactive in the free radical polymerization is present in the non-heterogeneous mixture in an amount less than about 20% by weight based on the total weight of the mixture;
   (b) deoxygenating the non-heterogeneous mixture if the mixture is not already deoxygenated;
   (c) heating the non-heterogeneous mixture to a sufficient temperature to generate sufficient initiator radicals from at least one thermal free radical initiator so as to initiate polymerization;
   (d) allowing the non-heterogeneous mixture to polymerize under essentially adiabatic conditions to yield an at least partially polymerized mixture;
   (e) adding additionally to the at least partially polymerized non-heterogeneous mixture at least one thermal free radical initiator;
   (f) deoxygenating the partially polymerized non-heterogeneous mixture if the mixture is not already deoxygenated; and
   (g) allowing the partially polymerized non-heterogeneous mixture to further polymerize under essentially adiabatic conditions to yield a further polymerized non-heterogeneous mixture;
   optionally wherein the non-reactive diluent is added additionally to the at least partially polymerized non-heterogeneous mixture of step (d).

2. The method of claim 1 wherein the free radically (co) polymerizable vinyl monomers are acrylate monomers.

3. The method of claim 1 wherein the free radically polymerizable monomers are monofunctional unsaturated acrylate esters of a non-tertiary alkyl alcohol, wherein the alkyl group contains about 1 to about 18 carbon atoms.

4. The method of claim 1 wherein the free radically polymerizable monomers are selected from the group consisting of isooctyl acrylate, isononyl acrylate, 2-ethylhexyl acrylate, decyl acrylate, dodecyl acrylate, n-butyl acrylate, hexyl acrylate, octadecyl acrylate, methyl acrylate, ethyl acrylate, butyl acrylate, methyl methacrylate, N-butyl methacrylate, N-vinyl pyrrolidone, N,N-dimethyl acrylamide, acrylic acid, acrylamide, N-octyl acrylamide, 2-methyl butyl acrylate, styrene, alpha methyl styrene, and mixtures thereof.

5. The method of claim 1 wherein the thermal free radical initiator(s) are selected from the group consisting of organic peroxides, organic hydroperoxides, azo-group initiators, and mixtures thereof.

6. The method of claim 5 wherein the thermal free radical initiator(s) are selected from the group consisting of benzoyl peroxide, di-t-amyl peroxide, di-cumyl peroxide, t-amyl hydroperoxide, t-butyl hydroperoxide, 2,2'-azobis(2,4-dimethylpentanenitrile), 2,2'-azobis(2-methylpropanenitrile), 2,2'-azobis(cyclohexanecarbonitrile), 2,2'-azobis(2-methylbutanenitrile), t-butyl peroxy benzoate, 2,5-dimethyl-2,5 Di-(t-butylperoxy)hexane, 2,5-dimethyl-2,5-Di-(t-butylperoxy)hexyne-3, and mixtures thereof.

7. The method of claim 1 wherein the non-reactive diluent is selected from the group consisting of plasticizers and tackifiers.

8. The method of claim 7 wherein the non-reactive diluent is a plasticizer.

9. The method of claim 8 wherein the plasticizer is selected from the group consisting of dioctyl phthalate, phosphate esters, and alkyl or aryl functionalized polyalkylene oxides.

10. The method of claim 7 wherein the non-reactive diluent is a tackifier.

11. The method of claim 10 wherein the tackifier is selected from the group consisting of esters of hydrogenated rosins and synthetic hydrocarbon resins.

12. The method of claim 1 wherein the further polymerized non-heterogeneous mixture of step (g) comprises the non-reactive diluent at a level less than 50% by weight, based upon the total weight of the further polymerized non-heterogeneous mixture.

13. The method of claim 1 wherein the non-heterogeneous mixture of step (a) comprises the non-reactive diluent at a level of about 1% to about 25% by weight, based upon the total weight of the non-heterogeneous mixture of step (a).

14. The method of claim 1 wherein the non-reactive diluent is added to the at least partially polymerized non-heterogeneous mixture of step (d) at a level of about 1% to about 50% by weight, based upon the total weight of the at least partially polymerized non-heterogeneous mixture of step (d).

15. The method of claim 1 wherein the non-reactive diluent is added to the at least partially polymerized non-heterogeneous mixture of step (d) at a level of about 1% to about 25% by weight, based upon the total weight of the at least partially polymerized non-heterogeneous mixture of step (d).

16. The method of claim 1 wherein the non-heterogeneous mixture of step (a) further comprises chain transfer agent.

17. The method of claim 16 wherein the chain transfer agent is selected from the group consisting of carbon tetrabromide, hexanebromoethane, bromotrichloromethane, 2-mercaptoethanol, t-dodecylmercaptan, n-octal mercaptan, isooctylthioglycoate, 3-mercapto-1,2-propanediol, cumene, and mixtures thereof.

18. The method of claim 1 wherein the non-heterogeneous mixture of step (a) further comprises crosslinking agent.

19. The method of claim 1 wherein the non-heterogeneous mixture of step (a) further comprises polymer comprising polymerized free radically polymerizable monomers.

20. The method of claim 1 wherein the non-heterogeneous mixture of step (a) further comprises a macromonomer.

21. The method of claim 1 further comprising cooling the at least partially polymerized non-heterogeneous mixture of step (d) before proceeding to step (e).

22. The method of claim 1 further comprising additionally adding to the partially polymerized non-heterogeneous mixture of step (e) free radically polymerizable monomers, crosslinking agent, chain transfer agent, or polymer comprising polymerized free radically polymerizable monomers, or any combination thereof.

23. The method of claim 1 further comprising repeating steps (e)-(g) one or more times.

24. A method of free radically polymerizing vinyl monomers comprising:
(a) providing a non-heterogeneous mixture compromising:
(i) free radically (co)polymerizable vinyl monomers,
(ii) at least one thermal free radical initiator, and
(iii) a miscible non-volatile solvent nonreactive in the free radical polymerization and generating less than 3% volatile organic content during polymerization and processing, wherein the miscible non-volatile solvent nonreactive in the free radical polymerization is present in the non-heterogeneous mixture in an amount less than about 20% by weight based on the total weight of the mixture, wherein the non-heterogeneous mixture optionally further comprises a filler;
(b) deoxygenating the mixture if the mixture is not already deoxygenated;
(c) heating the mixture to a sufficient temperature to generate sufficient initiator radicals from at least one thermal free radical initiator so as to initiate polymerization;
(d) allowing the mixture to polymerize under essentially adiabatic conditions to yield an at least partially polymerized mixture;
(e) adding additionally to the at least partially polymerized mixture at least one thermal free radical initiator;
(f) deoxygenating the partially polymerized mixture if the mixture is not already deoxygenated; and
(g) allowing the partially polymerized mixture to further polymerize under essentially adiabatic conditions to yield a further polymerized mixture;
wherein the filler is added to the at least partially polymerized mixture of step (d) if the mixture of step (a) does not comprise the filler; and
wherein the filler is optionally added additionally to the at least partially polymerized mixture of step (d) if the mixture of step (a) comprises the filler.

25. The method of claim 24 wherein the filler is selected from the group consisting of hydrophobic fumed silica particles, electrically conductive particles, and metal oxide particles.

26. The method of claim 24 wherein the filler is added at a level of about 1% to about 50% by weight, based upon the total weight of the mixture.

* * * * *

UNITED STATES PATENT AND TRADEMARK OFFICE
CERTIFICATE OF CORRECTION

| | | |
|---|---|---|
| PATENT NO. | : 7,968,661 B2 | Page 1 of 2 |
| APPLICATION NO. | : 11/275370 | |
| DATED | : June 28, 2011 | |
| INVENTOR(S) | : Mark F. Ellis | |

It is certified that error appears in the above-identified patent and that said Letters Patent is hereby corrected as shown below:

Column 1
Line 48, delete "compromising" and insert --comprising--
Line 67, after "mixture" insert --;--

Column 4
Line 5, delete "compromising" and insert --comprising--

Column 12
Line 29, delete "form" and insert --from--

Column 13
Lines 21-22, delete "isooctylthioglycoate" and insert --isooctylthioglycolate--

Column 14
Line 8, delete "para-acryloxyethoxybenophenone" and insert
    --para-acryloxyethoxybenzophenone--
Lines 8-9, delete "para-N-(methacryloxyethyl)-carbamoylethoxybenophenone" and insert
    --para-N-(methacryloxyethyl)-carbamoylethoxybenzophenone--

Column 15
Line 46, delete "adiabiticity" and insert --adiabaticity--

Column 17
Line 41, delete "Isooctylthioglycoate" and insert --Isooctylthioglycolate--

Column 22
Line 16, after "-43.7 deg C." delete "0"

Signed and Sealed this
Sixteenth Day of August, 2011

David J. Kappos
*Director of the United States Patent and Trademark Office*

Column 23
Line 29, delete "compromising" and insert --comprising--

Column 24
Line 64, delete "isooctylthioglycoate" and insert --isooctylthioglycolate--

Column 25
Line 19, delete "compromising" and insert --comprising--